US012594552B2

(12) United States Patent
Uemura et al.

(10) Patent No.: US 12,594,552 B2
(45) Date of Patent: Apr. 7, 2026

(54) CONTAINER AND LIQUID HANDLING DEVICE

(71) Applicant: Enplas Corporation, Saitama (JP)

(72) Inventors: Shigeru Uemura, Saitama (JP); Koji Noguchi, Saitama (JP); Daiki Kurihara, Saitama (JP)

(73) Assignee: Enplas Corporation, Saitama (JP)

( * ) Notice: Subject to any disclaimer, the term of this patent is extended or adjusted under 35 U.S.C. 154(b) by 624 days.

(21) Appl. No.: 18/069,352

(22) Filed: Dec. 21, 2022

(65) Prior Publication Data

US 2023/0201820 A1 Jun. 29, 2023

(30) Foreign Application Priority Data

Dec. 24, 2021 (JP) ................................ 2021-211410

(51) Int. Cl.
*B01L 3/00* (2006.01)

(52) U.S. Cl.
CPC ....... *B01L 3/502* (2013.01); *B01L 2400/0475* (2013.01)

(58) Field of Classification Search
CPC . B01L 3/502; B01L 2400/0475; B01F 27/115
See application file for complete search history.

(56) References Cited

U.S. PATENT DOCUMENTS

| | | | | |
|---|---|---|---|---|
| 5,993,674 A | 11/1999 | Rolchigo et al. | | |
| 2005/0173336 A1* | 8/2005 | Arnaud | ................ | B03D 1/1412 210/512.1 |
| 2016/0003814 A1 | 1/2016 | Hamasaki | | |

FOREIGN PATENT DOCUMENTS

| | | | | |
|---|---|---|---|---|
| CN | 100473438 C * | 4/2009 | ............... | B04C 3/06 |
| JP | 2002-504415 A | 2/2002 | | |
| WO | 2014129292 A1 | 8/2014 | | |

* cited by examiner

*Primary Examiner* — Jill A Warden
*Assistant Examiner* — Michael Stanley Gzybowski
(74) *Attorney, Agent, or Firm* — Shih IP Law Group, PLLC

(57) ABSTRACT

A container of the present invention includes a tube part and a spiral plate disposed inside the tube part. The spiral plate includes a spiral groove for converting a flow of a liquid moving inside the tube part into a vortex flow.

9 Claims, 7 Drawing Sheets

100

CONTAINER AND LIQUID HANDLING DEVICE

CROSS REFERENCE TO RELATED APPLICATIONS

This application is entitled to the benefit of Japanese Patent Application No. 2021-211410, filed on Dec. 24, 2021, the disclosure of which including the specification, drawings and abstract is incorporated herein by reference in its entirety.

TECHNICAL FIELD

The present invention relates to a container and a liquid handling device.

BACKGROUND ART

Typically, trace amounts of biological materials such as blood, proteins, and DNA are analyzed by performing processes such as mixing with reagents, heating, cooling, and detection. In recent years, microfluidic devices for sequentially performing such multiple processes have been known.

In analysis using such microfluidic devices, it is necessary to adequately mix a biological material with a reagent and the like. However, depending on the type of biological material or reagent, the mixing may be performed inadequately or agglomerate may form during the mixing.

As a method for detecting the analysis results of a trace amount of a biological material, the following method is known: a biological material containing fluorescently labeled magnetic microparticles is irradiated with excitation light, the image of the biological material is captured, and the number of bright spots captured is counted, thereby quantifying the biological material (see Patent Literature (hereinafter, referred to as PTL) 1).

PTL 1 describes a method for highly accurately quantifying a biological material by using magnetism. In the method described in PTL 1, a biological material containing fluorescently labeled magnetic microparticles is allowed to flow through a channel, and the magnetic microparticles are attracted by magnetism from the outside of the channel. The number of bright spots is counted with the biological material fixed to the inner wall of the channel by magnetism. During the analysis, reducing the diameter of the channel, through which the biological material flows, prevents formation of agglomerate of the biological material.

CITATION LIST

Patent Literature

PTL 1
WO2014/129292

SUMMARY OF INVENTION

Technical Problem

The method described in PTL 1 requires binding of magnetic microparticles to a biological material. In addition, the method described in PTL 1 requires a device that generates magnetism, resulting in a complicated structure of the entire device. Further, the diameter of the channel should be changed according to the size of the biological material to be detected.

An object of the present invention is to provide a container that can stir a liquid to prevent formation of agglomerate without using a special purpose device. Another object of the present invention is to provide a liquid handling device including the container.

Solution to Problem

A container of the present invention includes a tube part and a spiral plate disposed inside the tube part. The spiral plate includes a groove for converting a flow of a liquid moving inside the tube part into a vortex flow, the groove having a shape of a spiral.

A liquid handling device of the present invention includes a container housing part for housing the container, and the container housed in the container housing part.

Advantageous Effects of Invention

The present invention can provide a container capable of stirring a liquid to prevent formation of agglomerate without using a special purpose device. The present invention can also provide a liquid handling device including the container.

DESCRIPTION OF EMBODIMENTS

Hereinafter, a liquid handling device according to the present embodiment will be described with reference to the attached drawings.

Embodiment 1

Configuration of Liquid Handling Device

Figure 1:
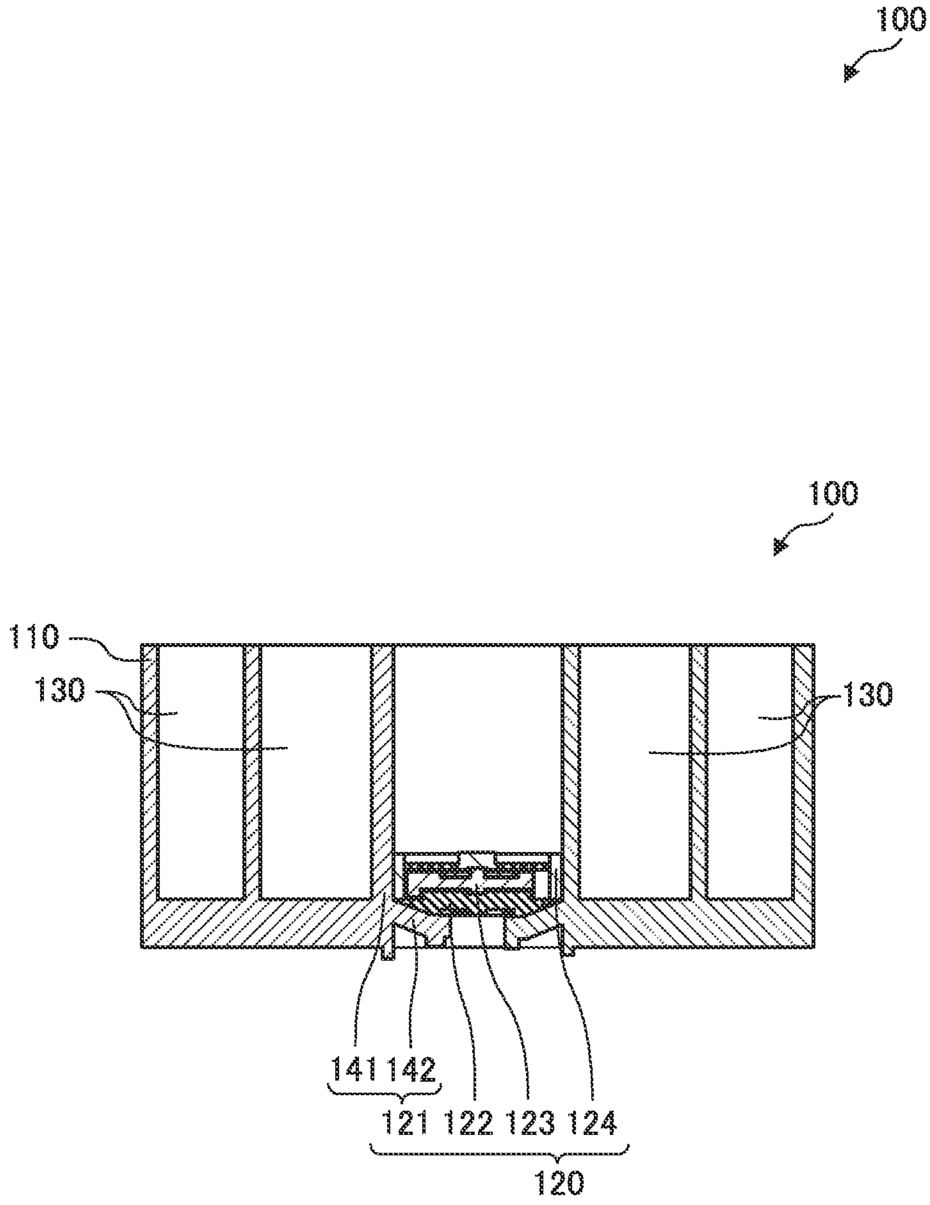
FIG. 1 is a schematic cross-sectional view of a liquid handling device according to Embodiment 1.

FIG. 1 is a schematic cross-sectional view of liquid handling device 100. In the following description, the side onto which container 120 opens is referred to as the "upper side (other end side or another end side)" and the bottom side of container 120 is referred to as the "lower side (one end side)" in FIG. 1.

As illustrated in FIG. 1, liquid handling device 100 includes container housing part 110 and container 120 that includes tube part 121 and spiral plate 122. In the present embodiment, liquid handling device 100 further includes at least one chamber 130 in addition to the above components. Liquid handling device 100 stirs liquid in container 120. Tube part 121 of container 120 may be detachably attached to container housing part 110, or tube part 121 of container 120 may be formed integrally with container housing part

110. In the present embodiment, tube part 121 of container 120 is formed integrally with container housing part 110, and container housing part 110 forms a side wall of chamber 130.

Liquid handling device 100 may have any configuration as long as the liquid handling device includes container housing part 110 and container 120. In the present embodiment, liquid handling device 100 is preferably configured to facilitate stirring of the liquid and collapsing (breaking up) of agglomerate within the liquid in container 120.

Herein, a liquid means, for example, a solution or a dispersion liquid. Particles may be agglomerated in the dispersion liquid.

Chamber 130 is a compartment capable of containing a liquid. The number of chambers 130 is not limited, which may be one or more than one. Chamber 130 is connected to container 120 and/or another chamber 130 via at least one channel. Chamber 130 may house, for example, a liquid to be stirred, a solvent, or a reagent.

Configuration of Container

Figure 2:
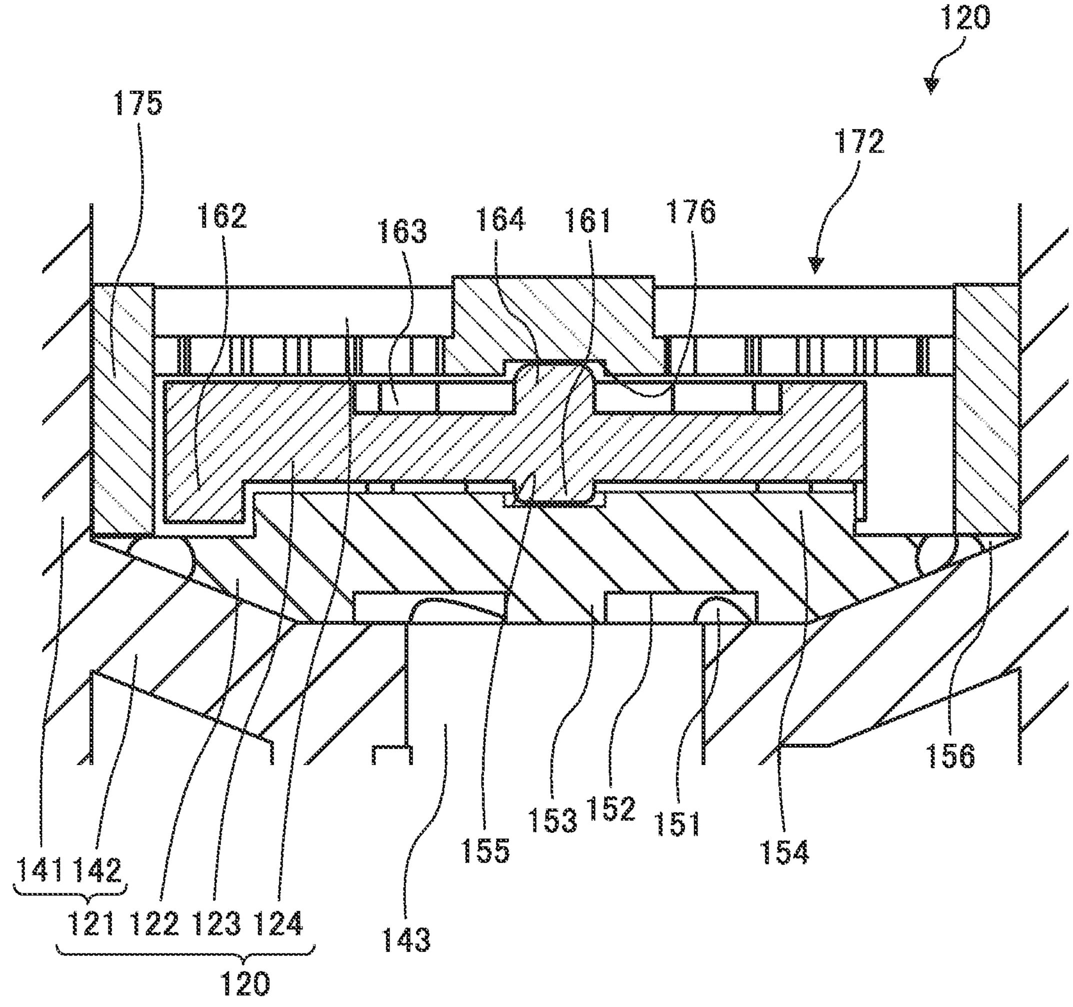
FIG. 2 is an enlarged cross-sectional view illustrating part of the container.

FIG. 2 is an enlarged cross-sectional view illustrating part of container 120.

As illustrated in FIGS. 1 and 2, container 120 includes tube part 121 and spiral plate 122. In the present embodiment, container 120 further includes rotation plate 123 and collapsing part 124 in addition to the above components.

Tube part 121 forms the outer wall of container 120. A liquid moves inside tube part 121. In the present embodiment, tube part 121 is configured in such a way that a liquid is injected from the lower end of the tube part, and the liquid moves between any positions from the lower end to the upper end of the tube part.

In the present embodiment, tube part 121 includes side wall 141 and bottom wall 142. Side wall 141 may have any shape as long as a liquid can move inside tube part 121. Side wall 141 may have a shape of a cylindrical tube or a rectangular tube. In the present embodiment, side wall 141 has a shape of a cylindrical tube.

Bottom wall 142 forms part of the bottom of container 120. In the present embodiment, bottom wall 142 has a tapered surface. Bottom wall 142 is provided with through hole 143 for moving liquid into and out of the tube part. The position of through hole 143 in bottom wall 142 is not limited. With bottom wall 142 in plan view, through hole 143 may be disposed at the center of bottom wall 142 or at the outer edge of bottom wall 142. In the present embodiment, through hole 143 is disposed at the center of bottom wall 142. Through hole 143 may have any diameter. In the present embodiment, the diameter of through hole 143 is smaller than spiral plate 122 and than a described-below recess of spiral plate 122, from the viewpoint of positioning spiral plate 122.

Figure 3A:
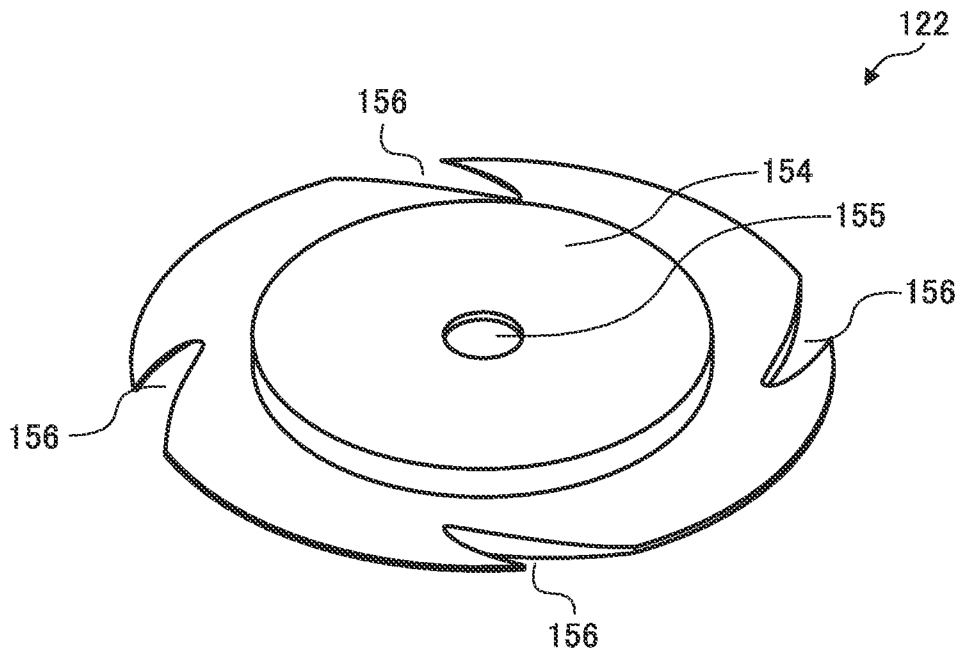
FIGS. 3A and 3B are perspective views of a spiral plate.
Figure 3B:
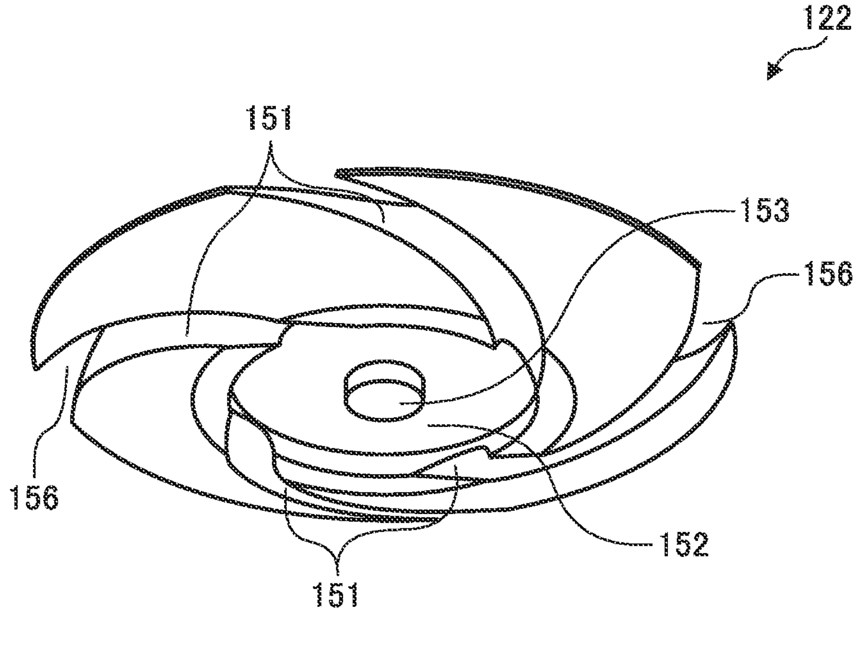

FIGS. 3A and 3B are perspective views of spiral plate 122. FIG. 3A is a perspective view of spiral plate 122 as viewed from the upper side, and FIG. 3B is a perspective view of spiral plate 122 as viewed from the lower side.

Spiral plate 122 converts a flow of a liquid entering container 120 into a vortex flow. Spiral plate 122 is disposed inside tube part 121 on the one end side of tube part 121. Spiral plate 122 converts a flow of the liquid introduced from the bottom of container 120 into a vortex flow, but the spiral plate itself is fixed by collapsing part 124 so as not to rotate. Spiral plate 122 may have any configuration as long as the spiral plate can convert a flow of a liquid into a vortex flow. In the present embodiment, spiral plate 122 substantially has a shape of an inverted truncated cone. Spiral plate 122 includes at least one groove 151, first recess 152, first protrusion 153, second protrusion 154, and second recess 155. Groove 151, first recess 152, and first protrusion 153 are disposed on the lower surface of spiral plate 122. Second protrusion 154 and second recess 155 are disposed on the upper surface of spiral plate 122.

Groove 151 spirals a liquid flow. The shape of groove 151 in plan view is spiral. This configuration allows groove 151 to bend a liquid flow in such a way that the liquid flows along the tangential line of the outer edge of spiral plate 122. In the present embodiment, groove 151 is disposed along the inclined surface of spiral plate 122. Groove 151 thus bends the liquid flow in such a way that the liquid flows along the tangential line of the outer edge of spiral plate 122, and also the groove guides the liquid flow from the lower side to the upper side. Therefore, the liquid flow is converted into a vortex flow. The center side end of groove 151 opens onto the inner surface of first recess 152, and the outer edge side end of groove 151 communicates with communication part 156. The number of grooves 151 is not limited as long as the above functions can be obtained. The number of grooves 151 may be one or more than one. In the present embodiment, the number of grooves 151 is four. When spiral plate 122 includes a plurality of grooves 151, the plurality of grooves 151 are preferably arranged evenly in the circumferential direction of spiral plate 122 in plan view. The depth of groove 151 may be the same or different at any different positions. In the present embodiment, the depth of groove 151 is the same at any different positions. The width of groove 151 may be the same or different at any different positions. In the present embodiment, the width of groove 151 is the same at any different positions.

Communication part 156 is disposed at the outer edge side end of groove 151 and connects the one end side of tube part 121 with the other end side of tube part 121. Communication part 156 may have any configuration as long as the above functions can be obtained. Communication part 156 may be a through hole or a notch. In the present embodiment, communication part 156 is a notch. The number of communication parts 156 is not limited. In the present embodiment, the number of communication parts 156 is four, which is the same as the number of grooves 151.

First recess 152 is a liquid reservoir that temporarily stores a liquid to be sent to groove 151. First recess 152 opens onto the central portion of the bottom surface—located on the lower side—of spiral plate 122. First recess 152 may have any shape. The shape of first recess in plan view may be circular or rectangular. From the viewpoint of guiding the stored liquid to groove 151, the shape of first recess 152 in plan view is preferably circular. First recess 152 may have any depth. The depth of first recess 152 may be larger or smaller than the depth of the opening of groove 151 at the center side end. The depth of first recess 152 may or may not be constant. From the viewpoint of guiding the stored liquid to groove 151, the depth of first recess 152 is preferably about the same as the depth of the opening of groove 151 at the center side end. In the present embodiment, the depth of first recess 152 is slightly larger than the depth of the opening of groove 151 at the center side end.

First protrusion 153 guides a liquid from the lower side toward groove 151. First protrusion 153 is disposed at the center of the bottom surface of the first recess 152. First protrusion 153 may have any shape, which may be of, for example, a columnar body or a cone body. In the present embodiment, the shape of first protrusion 153 is cylindrical. In the present embodiment, the height of first protrusion 153 is larger than the depth of first recess 152 at the deepest portion thereof.

Second protrusion 154 supports rotation plate 123. Second protrusion 154 may have any shape. In the present embodiment, the shape of second protrusion 154 is cylindrical. In the present embodiment, second protrusion 154 is disposed on the upper surface of spiral plate 122 at the center of the surface. Second recess 155 is disposed at the center of second protrusion 154.

Second recess 155 engages with third protrusion 161 of rotation plate 123. Second recess 155 may have any shape as long as the second recess can engage with third protrusion 161 of rotation plate 123. The shape of second recess 155 is preferably complementary to the shape of third protrusion 161. In the present embodiment, the shape of the inside space of second recess 155 is cylindrical.

Figure 4A:
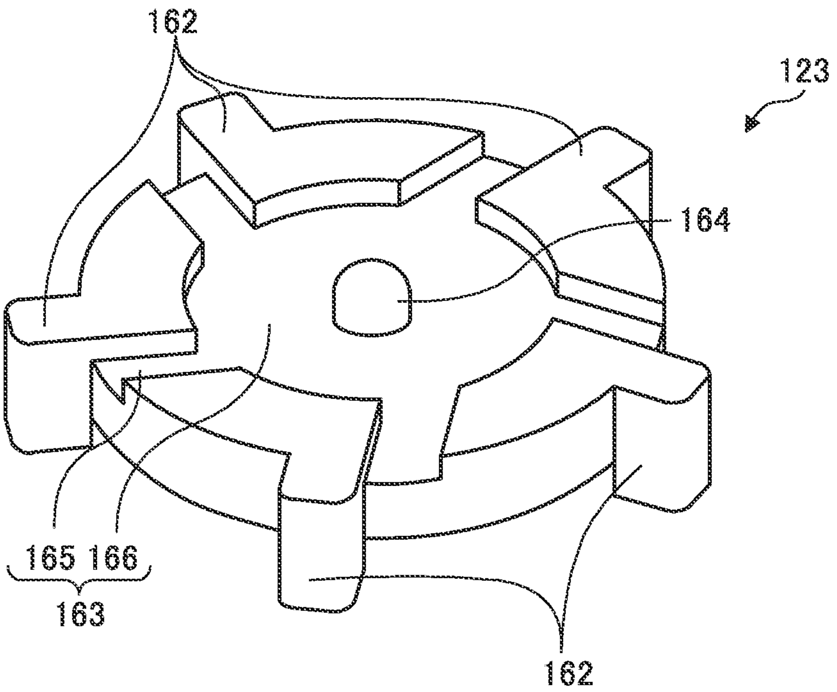
FIGS. 4A and 4B are perspective views of a rotation plate.
Figure 4B:
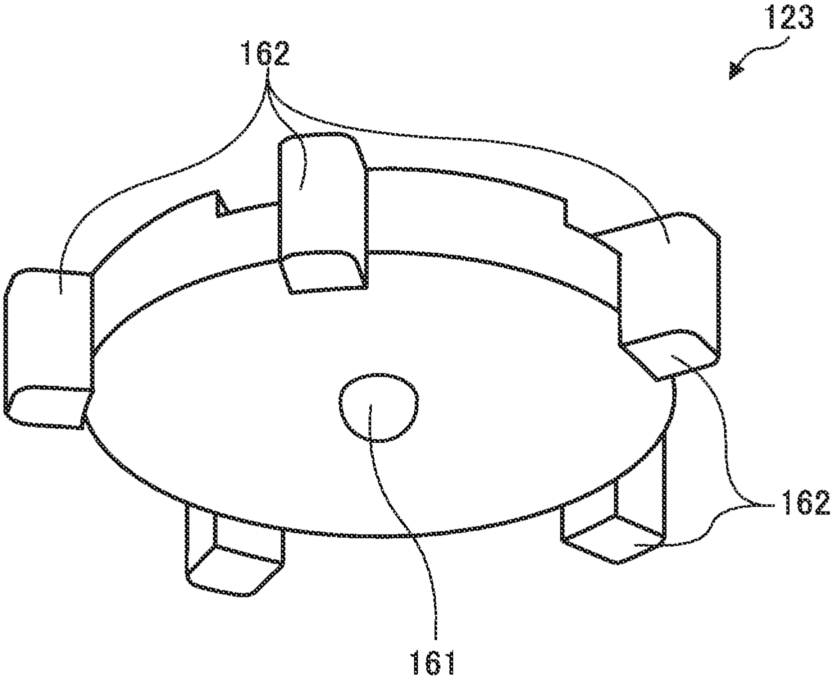

FIGS. 4A and 4B are perspective views of rotation plate 123. FIG. 4A is a perspective view of rotation plate 123 as viewed from the upper side, and FIG. 4B is a perspective view of rotation plate 123 as viewed from the lower side.

Rotation plate 123 is rotated by a vortex flow generated by spiral plate 122. Rotation plate 123, except for the central portion thereof, is disposed with slight gaps between the rotation plate and spiral plate 122 and between the rotation plate and collapsing part 124. In the present embodiment, rotation plate 123 has a substantially disk shape. As illustrated in FIGS. 4A and 4B, rotation plate 123 includes third protrusion 161, at least one blade 162, junction groove 163, and fourth protrusion 164. Third protrusion 161 is disposed on the lower surface of rotation plate 123, blade 162 is disposed on the side surface of rotation plate 123, and junction groove 163 and fourth protrusion 164 are disposed on the upper surface of rotation plate 123.

Third protrusion 161 engages with second recess 155 of spiral plate 122. Third protrusion 161 is disposed at a position corresponding to second recess 155 of spiral plate 122. In the present embodiment, third protrusion 161 is disposed on the lower surface of rotation plate 123 at the center of the surface. The shape of third protrusion 161 is preferably complementary to the shape of second recess 155. In the present embodiment, the shape of third protrusion 161 is substantially cylindrical.

Blade 162 rotates rotation plate 123 upon receiving of a vortex flow. Blade 162 may have any shape as long as the blade can receive a vortex flow generated by spiral plate 122. In the present embodiment, blade 162 has a columnar shape. Blade 162 is disposed in such a way that the undersurface thereof faces the upper surface of spiral plate 122 with a slight gap therebetween. Blade 162 is disposed in such a way that the side surface thereof on the inner side faces the side surface of second protrusion 154 of spiral plate 122 with a slight gap therebetween. The number of blades 162 is not limited. The number of blades 162 is preferably greater than the number of communication parts 156 of spiral plate 122 from the viewpoint of efficiently receiving a vortex flow. In the present embodiment, the number of blades 162 is five. Blades 162 are preferably arranged evenly in the circumferential direction of rotation plate 123 in plan view.

Junction groove 163 expands the vortex flow in the surface direction of the upper surface of rotation plate 123. Junction groove 163 includes at least one individual groove 165 and collecting recess 166. Individual groove 165 guides the vortex flow to collecting recesses 166. Individual groove 165 opens onto the side surface of rotation plate 123 and collecting recess 166. The number of individual grooves 165 is not limited. In the present embodiment, the number of individual grooves 165 is five, which is the same as the number of blades 162. The vortex flow generated by spiral plate 122 flows through individual grooves 165 and the top surface of rotation plate 123 into collecting recess 166.

Collecting recess 166 temporarily stores the liquid from individual grooves 165. Collecting recess 166 is connected to individual grooves 165. Fourth recess 164 is disposed at the center of collecting recess 166. Fourth protrusion 164 engages with third recess 176 of collapsing part 124. In the present embodiment, the shape of fourth protrusion 164 is substantially cylindrical.

Figure 5A:
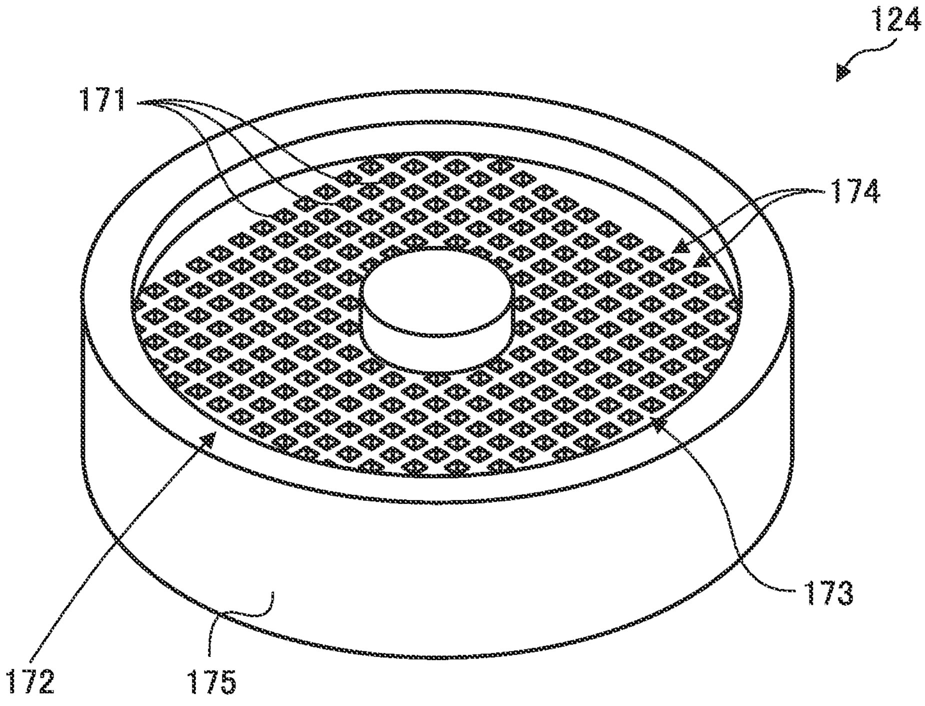
FIGS. 5A and 5B are perspective views of a collapsing part.
Figure 5B:
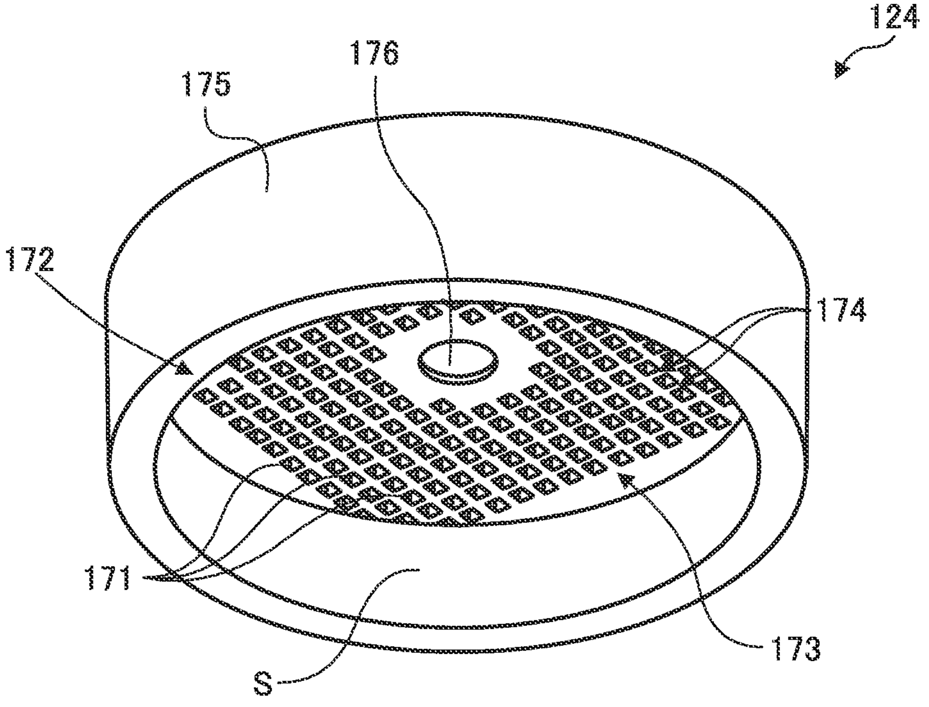

FIGS. 5A and 5B are perspective views of collapsing part 124. FIG. 5A is a perspective view of collapsing part 124 as viewed from the upper side, and FIG. 5B is a perspective view of collapsing part 124 as viewed from the lower side.

Collapsing part 124 collapses the vortex flow of a liquid and increases the stirring effect. Collapsing part 124 may have any configuration as long as the above functions can be obtained. Collapsing part 124 may include mesh 172 with at least one liquid passage hole (namely, hole through which liquid passes) 171. The collapsing part may be a slit, a louver, a membrane, or a non-woven fabric. Collapsing part 124 may be formed of any material. Examples of the materials for collapsing part 124 include resins such as polypropylene (PP), polystyrene (PS), polyamide (PA), polymethylmethacrylate (PMMA), cyclic olefin copolymer (COC), and polycarbonate (PC), and glass. A collapsing part 124 made of resin can be produced by, for example, injection molding. As illustrated in FIGS. 5A and 5B, collapsing part 124 includes mesh 172 and tube wall 175 in the present embodiment.

Mesh 172 is provided with a plurality of liquid passage holes 171. In the present embodiment, mesh 172 is formed of a plurality of ribs (a plurality of first ribs 173 and a plurality of second ribs 174). The plurality of first ribs 173 each extend in a first direction, and the plurality of second ribs 174 each extend in a second direction perpendicular to the first direction. This configuration forms the plurality of liquid passage holes 171 each in a region between first ribs 173 and between second ribs 174 in plan view.

Mesh 172 may have any shape in plan view. In the present embodiment, the shape of mesh 172 in plan view is circular. Each liquid passage hole 171 in mesh 172 may have any shape in plan view. The shape of liquid passage hole 171 in plan view may be circular or polygonal. In the present embodiment, the plurality of first ribs 173 and the plurality of second ribs 173 form the plurality of liquid passage holes 171 that are square in plan view. The length of one side of liquid passage hole 171 is appropriately set according to, for example, the viscosity and type of the liquid. The length of one side of liquid passage hole 171 (opening of mesh 172) is preferably within the range of 0.1 μm to 500 μm, more preferably within the range of 0.2 to 300 μm. Mesh 172 with liquid passage holes 171 (opening of the mesh 172) whose side has a length within the above range is easier to be produced by injection molding.

The undersurface of mesh 172 faces the top surface of rotation plate 123 with a slight gap therebetween. Third recess 176 that engages with fourth protrusion 164 of rotation plate 123 is disposed at the center—on the lower side—of mesh 172. The shape of third recess 176 is preferably complementary to the shape of fourth protrusion 164.

Tube wall 175 is disposed so as to surround mesh 172. In the present embodiment, tube wall 175 has a shape of a substantially cylindrical tube. The undersurface of tube wall 175 contacts the top surface of spiral plate 122. This configuration allows tube wall 175 to partially cover communication part 156. Changing the thickness of tube wall 175 thus can adjust the open region of communication part 156. Mesh 172 is disposed inside the upper portion of tube wall 175, and space S is formed inside the lower portion of tube wall 175. Rotation plate 123 is disposed in space S. The inner surface of tube wall 175 faces blades 162 of rotation plate 123 with a slight gap therebetween.

Liquid Stirring Method

Hereinafter, a method for stirring a liquid will be described.

Spiral plate 122, rotation plate 123, and collapsing part 124 are sequentially stacked inside tube part 121. Collapsing part 124 fixes spiral plate 122 and rotatably (about the axis of tube part 121) supports rotation plate 123.

A liquid is then injected into container 120. In the present embodiment, the liquid is injected from through hole 143 disposed at the bottom of container 120. Any method may be used for injecting a liquid into container 120. For example, the liquid is injected with, for example, a syringe or a plunger. The injected liquid flows into spiral plate 122 in the order of first recess 152 and groove 151. The flow of a liquid having flowed into groove 151 is converted into vortex flow and flows out from communication part 156 toward the upper side of container 120. In this manner, the flow of a liquid injected into container 120 is converted into a vortex flow, thereby stirring the liquid. In a dispersion liquid including agglomerated particles, the agglomerated particles can be dispersed, thereby preventing the formation of agglomerate.

The vortex flow flowing out from spiral plate 122 collides with blade 162 of rotation plate 123. Rotation plate 123 is rotated by the vortex flow in the same direction as the circling direction of the vortex flow. Due to the centrifugal force, the vortex flow from spiral plate 122 flows along the side surface of rotation plate 123, without entering the space under rotation plate 123, to reach the upper portion of rotation plate 123. The vortex flow having reached the upper portion of rotation plate 123 flows along individual grooves 165 and the top surface of rotation plate 123 to reach collecting recess 166. During this process, the liquid flows into the gaps formed between the top surface of spiral plate 122 and the undersurfaces of blades 162 of the rotation plate 123, between the side surfaces of blades 162 of rotation plate 123 and the inner surface of tube wall 175 of collapsing part 124, and between the top surface of rotation plate 123 and the undersurface of mesh 172 of collapsing part 124. This configuration can increase the stirring effect, and also prevent the formation of agglomerate.

The liquid having reached collecting recess 166 collides with collapsing part 124. The liquid having reached collapsing part 124 passes through collapsing part 124 via liquid passage holes 171. The collision of the liquid with mesh 172 of collapsing part 124 can further increase the stirring effect, and also prevent the formation of agglomerate.

The stirred liquid is stored in the upper portion of collapsing part 124.

Using a syringe, a plunger, or the like for moving the liquid into and out of container 120 can further increase the stirring effect.

Container 120 including rotation plate 123 and collapsing part 124 is described above, but it is possible for container 120 not to include rotation plate 123 or collapsing part 124. Such a container still can stir a liquid and prevent the formation of agglomerate.

Effects

Liquid handling device 100 according to the present embodiment can stir a liquid to prevent formation of agglomerate without using a special purpose device.

Embodiment 2

Hereinafter, liquid handling device 200 according to Embodiment 2 will be described. Liquid handling device 200 according to the present embodiment is substantially the same as liquid handling device 100 of Embodiment 1 except for the configuration of container 120. Therefore, container 120 will be mainly described.

Configuration of Liquid Handling Device

Figure 6:
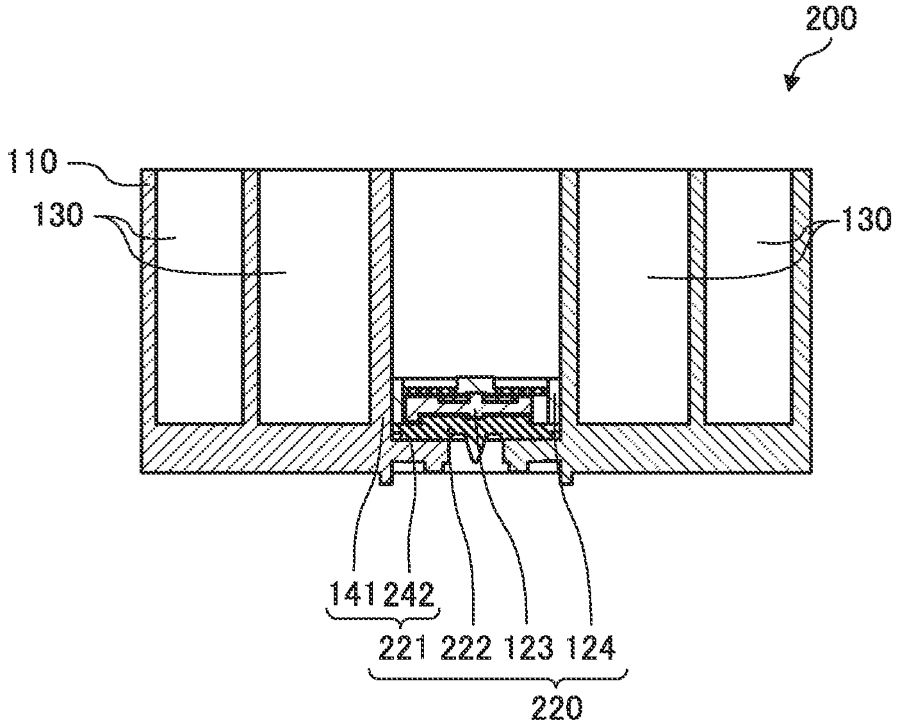
FIG. 6 is a schematic cross-sectional view of a liquid handling device according to Embodiment 2.

FIG. 6 is a schematic cross-sectional view of liquid handling device 200.

As illustrated in FIG. 6, liquid handling device 200 includes container housing part 110 and container 220 that includes tube part 222 and spiral plate 222. Liquid handling device 200 according to the present embodiment further includes chamber 130 in addition to the above components. Container housing part 110 and chamber 130 are the same as those in Embodiment 1, thus the description thereof is omitted.

Configuration of Container

As illustrated in FIG. 6, container 220 includes tube part 221 and spiral plate 222. In the present embodiment, container 220 further includes rotation plate 123 and collapsing part 124 in addition to the above components. Rotation plate 123 and collapsing part 124 are the same as those in Embodiment 1, thus the description thereof is omitted. In the present embodiment, tube part 221 has a shape of a cylindrical tube.

Bottom wall 242 forms the bottom of container 220. Unlike Embodiment 1, bottom wall 242 does not have a tapered surface in the present embodiment.

Figure 7:
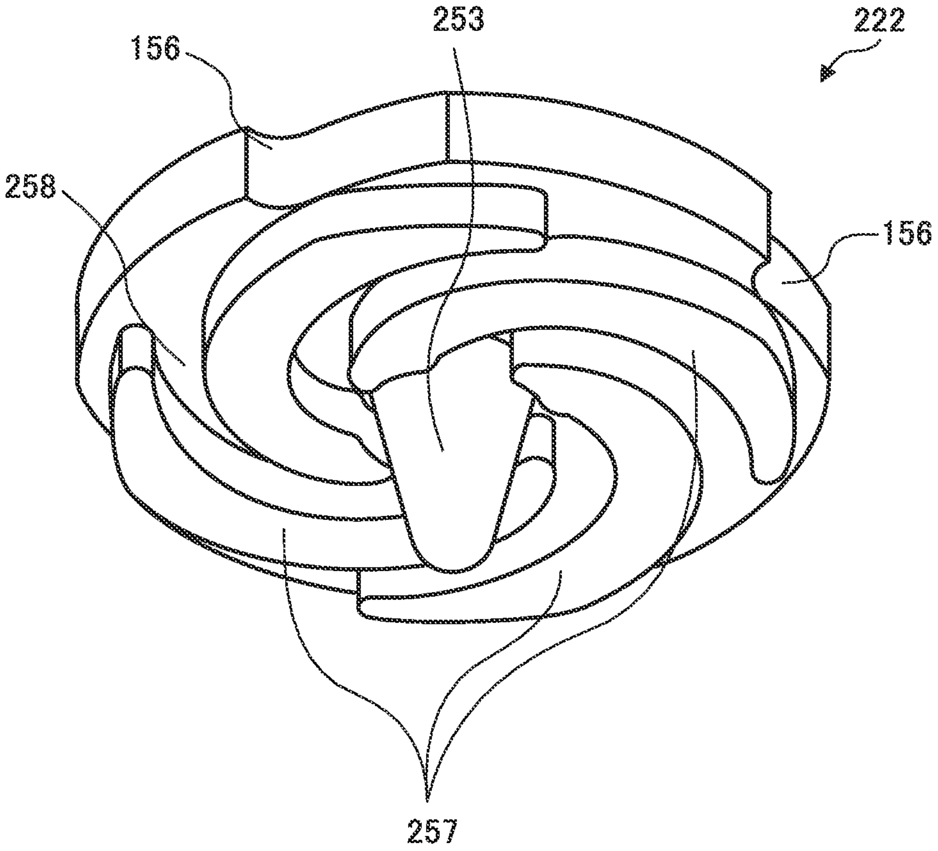
FIG. 7 is a perspective view of a spiral plate as viewed from the back side.

FIG. 7 is a perspective view of spiral plate 222 as viewed from the lower side.

As illustrated in FIGS. 3 and 7, spiral plate 222 includes at least one ridge 257, first protrusion 253, second protrusion 154, second recess 155, and at least one spiral groove 258. Ridge 257, first protrusion 253, and spiral groove 258 are disposed on the lower surface of spiral plate 222. Second protrusion 154 and second recess 155 are disposed on the upper surface of spiral plate 222. The configurations of second protrusion 154 and second recess 155 are the same as those in Embodiment 1, thus the description thereof is omitted.

Ridge 257 spirals a liquid flow. The shape of ridge 257 in plan view is spiral. In the present embodiment, the number of ridges 257 is four. The plurality of ridges 257 are preferably arranged evenly in the circumferential direction of spiral plate 222 in plan view. The height of ridge 257 may be constant or changed from the upstream end to the downstream end. In the present embodiment, the height of ridge 257 is constant from the upstream end to the downstream end. Two adjacent ridges 257 form spiral groove 258 through which liquid passes. This configuration allows spiral groove 258 to bend a liquid flow in such a way that the liquid flows along the tangential line of the outer edge of spiral plate 222. In addition, spiral groove 258 is disposed along the bottom surface of spiral plate 222. Therefore, spiral groove 258 bends a liquid flow in such a way that the liquid flows along the tangential line of the outer edge of spiral plate 222. Accordingly, the liquid flow is converted into a vortex flow. The center side end of spiral groove 258 opens onto the vicinity of first protrusion 253. Communication part 156 is disposed at the outer edge side end of spiral groove 258. The number of spiral grooves 258 is not limited as long as the above functions can be obtained.

First protrusion 253 guides a liquid from the lower side toward spiral grooves 258. First protrusion 253 is disposed on the lower surface of spiral plate 222 at the center of the surface. First protrusion 153 may have a shape of a columnar body or a cone body. In the present embodiment, the shape of first protrusion 253 is substantially conical.

Container 220 including rotation plate 123 and collapsing part 124 is described above, but it is possible for container 220 not to include rotation plate 123 or collapsing part 124. Such a container still can stir a liquid and prevent the formation of agglomerate.

Effects

Liquid handling device 200 according to the present embodiment has the same effects as liquid handling device 100 according to Embodiment 1.

INDUSTRIAL APPLICABILITY

The container and liquid handling device according to the present invention can be applied, for example, to the analysis of trace amounts of biological samples.

REFERENCE SIGNS LIST

100, 200 Liquid handling device
110 Container housing part
120, 220 Container
121, 221 Tube part
122, 222 Spiral plate
123 Rotation plate
124 Collapsing part
130 Chamber
134 Through hole
141 Side wall
142, 242 Bottom wall
143 Through hole
151 Groove
152 First recess
153, 253 First protrusion
154 Second protrusion
155 Second recess
156 Communication part
161 Third protrusion
162 Blade
163 Junction groove
164 Fourth protrusion
165 Individual groove
166 Collecting recess
171 Liquid passage hole
172 Mesh
173 First rib
174 Second rib
175 Tube wall
176 Third recess
257 Ridge
258 Spiral groove

What is claimed is:

1. A container, comprising:

a tube part; and a spiral plate disposed inside the tube part, the spiral plate including a groove for converting a flow of a liquid moving inside the tube part into a vortex flow, the groove having a shape of a spiral, wherein a center side end of the groove opens onto a central portion of the spiral plate, and a first recess having a depth larger than that of the center side end of the groove is disposed in the central portion.

2. The container according to claim 1, wherein:

the spiral plate is disposed so as to be substantially perpendicular to an axis of the tube part; and the spiral plate includes a communication part at an outer edge side end of the groove, the communication part connecting one end side of the tube part with another end side of the tube part.

3. The container according to claim 1, wherein a first protrusion is disposed at a center of the first recess, the first protrusion having a height larger than the depth of the first recess.

4. A container, comprising;

a tube part; and a spiral plate disposed inside the tube part, the spiral plate including a groove for converting a flow of a liquid moving inside the tube part into a vortex flow, the groove having a shape of a spiral, wherein:

the spiral plate is disposed inside the tube part on one end side of the tube part; and the container further comprises a collapsing part disposed inside the tube part closer to another end side of the tube part than the spiral plate is, the collapsing part being for collapsing the vortex flow of the liquid.

5. The container according to claim 4, wherein the collapsing part includes mesh with at least one liquid passage hole.

6. The container according to claim 4, further comprising, a rotation plate disposed inside the tube part between the spiral plate and the collapsing part, wherein the rotation plate is rotated about an axis of the tube part by the vortex flow of the liquid generated by the spiral plate.

7. The container according to claim 6, wherein the rotation plate includes a blade disposed on a side surface of the rotation plate, the blade being for receiving the vortex flow of the liquid generated by the spiral plate.

8. A liquid handling device, comprising:

a container housing part; and the container according to claim 1 housed in the container housing part, wherein the container housing part is configured to house the container.

9. A liquid handling device, comprising:

a container housing part; and the container according to claim 4 housed in the container housing part, wherein the container housing part is configured to house the container.

* * * * *